Sept. 26, 1933.　　　　　M. REITERER　　　　　1,928,542
APPARATUS FOR SECURING REPAIR PATCHES TO TUBES OR HOSES
Filed Nov. 28, 1932
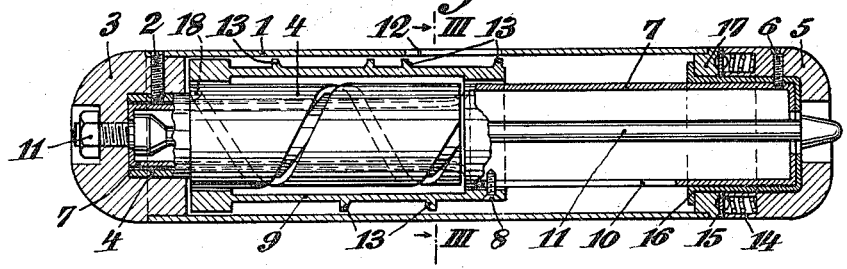
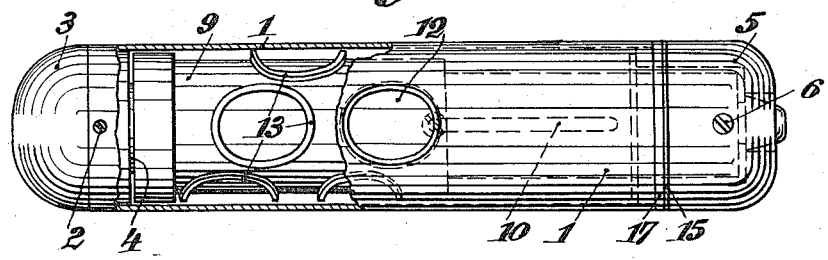
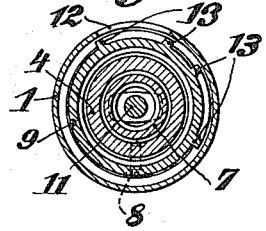
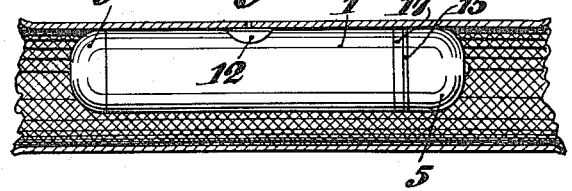
M. Reiterer
INVENTOR
By Marks & Clerk
Attys.

Patented Sept. 26, 1933

1,928,542

UNITED STATES PATENT OFFICE 1,928,542

APPARATUS FOR SECURING REPAIR PATCHES TO TUBES OR HOSES

Michael Reiterer, Wimpassing, Austria

Application November 28, 1932, Serial No. 644,741, and in Austria December 2, 1931

3 Claims. (Cl. 137—99)

It is already known to mend a tube or hose from the inside thereof by pushing a mandrel, on which is disposed a sticky patch, into said tube and pressing the latter onto said mandrel, whereby the patch is united with the tube.

This invention relates to a special construction of an apparatus of this kind by which it is possible to mend successively for instance leaky places by means of the mandrel inserted in the tube, whereby the patches, protected below the cover of the mandrel, may be brought directly underneath the place of leakage and now the patches are uncovered and, with their full adhesive power, connected with the wall of the tube.

The apparatus according to this invention consists of a cylindric mandrel closed by two covers, one of the latter being rotatable with respect to the other cover and connected with a tubular member, constituting the outer jacket of the mandrel and furnished with an opening for the discharge of patches, while the other cover carries an interior tubular core with cups for the patches and means are provided for disposing a cup exactly below the opening for the discharge of patches.

According to a further construction one of the said covers is rigidly connected with a screw-shaft which is engaged by a sleeve, adapted to move on the tubular core in the longitudinal direction thereof and on its outside provided with the cups which are disposed in the manner of the screw thread.

The mandril, provided with one or more sticky patches, is pushed into the tube to be mended until the damaged places are reached and after its patch-discharge-opening is disposed opposite the damaged place of the tube, one end of the mandrel is held fast in the tube while the second end thereof is turned, so that a patch passes underneath the said damaged place and is connected with the tube by pressing from outside the latter on to the mandrel. The same procedure is repeated if a number of damaged places are mended in succession.

The mended place is pressed by a screw clamp or the like on to the oppositely disposed wall of the tube until the rubber solvent has volatilized.

One mode of carrying out the present invention is illustrated by way of example on the accompanying sheet of drawing in which Fig. 1 shows the apparatus in sectional elevation. Fig. 2 is a plan view of the mandrel or apparatus with the casing partly broken away. Fig. 3 is a cross-sectional view, the section being taken on line III—III of Fig. 1. Fig. 4 shows the mandrel or apparatus within a tube at the place to be mended.

A tubular member 1 suited to the usual diameter of a tube is connected at one end, by a set screw 2, with a head piece 3 and an inserted screw shaft 4 in such manner, that when holding the tubular member 1 neither said shaft nor said head piece are rotated. A head piece 5 is inserted rotatable at the other end of the tubular member 1 and is connected with a tubular core 7 by means of a set screw 6. A set screw 8 connects the core 7 with a sleeve 9, which engages the screw threads of the shaft 4 by means of projections 18. The screw 8 engages a slot 10 of the core 7 and therefore, when rotating the head piece 5 with respect to the head piece 3 which is held fast, the sleeve 9 slides in the annular space formed between the outer tubular member 1 and the core 7. The stroke corresponds to a complete revolution of the head piece 5. A long screw bolt 11 facilitates the insertion of the head pieces 3 and 5 and axially but rotatably connects the latter. The outer tubular member 1 is provided with an opening 12 for the removal of patches. When turning the head piece 5, the cups 13 distributed on the sleeve 9 in accordance with the screw thread of the shaft 4 can be brought successively underneath said opening 12 for the insertion or removal of the patches.

The number of cups 13 depends on the size of the patches and the diameter of the mandrel. A circular piece of linen, placed into a cup 13 and coated with unvulcanized rubber, is soaked with a rubber-solvent before being covered. In the positions of the rotary head piece 5 with respect to the tubular member 1 in which the patch-discharge opening 12 coincides with one of the cups 13, balls located in recesses 14 of the rotary head piece 5 and subjected to the pressure of springs engage bearings 15 which are arranged in a ring 17 held in place in the tubular member 1 by a sleeve 16. Therefore when turning the head piece 5 only the engagement of the balls is to be watched in order to bring the patch in the next cup 13 exactly below the discharge opening 12 and to cement the patch to the tube by pressing it on to the tube-wall above the discharge opening 12. According to the illustrated embodiment five damaged places can be mended in succession, because the mandrel or apparatus for the common fire-extinguishing hoses permits the arrangement of six cups 13.

If the apparatus is used for the application of a single patch only, the screw-shaft 4 and the sleeve 9 may be dispensed with and in this case the two necessary cups 13 are arranged on the tubular core 7.

The apparatus according to the present invention can be used for hoses or tubes of any length.

What I claim is:—

1. Apparatus for securing repair-patches to be cemented to the inner wall of a tube or hose, comprising in combination a tubular member with an opening in its wall, a head piece fixed to one end of the latter, a second head piece rotatably attached to the other end of said member, a core located in said tubular member and fixed to the rotatable head piece, and cups on said core for the disposition of repair-patches.

2. Apparatus for securing repair-patches to be cemented to the inner wall of a tube or hose, comprising in combination a tubular member with an opening in its wall, a head piece fixed to one end of the latter, a second head piece rotatably attached to the other end of said member, a core located in said tubular member and fixed to the rotatable head piece, cups on said core for the disposition of repair-patches, and means in said member and the rotatable head piece securing the latter in the adjusted position.

3. Apparatus for securing repair-patches to be cemented to the inner wall of a tube or hose, comprising in combination a tubular member with an opening in its wall, a head piece rotatably attached to one end of said member, a tubular core located in the latter, a second head piece fixed to the other end of said member, a screw shaft arranged within said core and fixed to said second head piece, means on said core to engage the thread of the screw shaft, and cups arranged on said core in a screw-line.

MICHAEL REITERER.